United States Patent
Watanabe et al.

(10) Patent No.: US 8,771,559 B2
(45) Date of Patent: Jul. 8, 2014

(54) CONDUCTIVE SINTERED OXIDE, THERMISTOR ELEMENT INCLUDING THE SAME, AND TEMPERATURE SENSOR INCLUDING THE SAME

(75) Inventors: Hiroshi Watanabe, Kitanagoya (JP); Yasuyuki Okimura, Inuyama (JP); Shinji Ban, Gifu (JP); Takeshi Mitsuoka, Konan (JP)

(73) Assignee: NGK Spark Plug Co., Ltd., Aichi (JP)

( * ) Notice: Subject to any disclaimer, the term of this patent is extended or adjusted under 35 U.S.C. 154(b) by 244 days.

(21) Appl. No.: 13/210,684

(22) Filed: Aug. 16, 2011

(65) Prior Publication Data

US 2012/0043511 A1    Feb. 23, 2012

(30) Foreign Application Priority Data

Aug. 17, 2010 (JP) ................................ 2010-182635

(51) Int. Cl.
*H01B 1/02* (2006.01)
(52) U.S. Cl.
USPC .............. 252/521.1; 252/519.13; 252/519.15; 338/22 R; 374/185
(58) Field of Classification Search
USPC ............. 252/521.1, 519.13, 519.15; 374/185; 338/22 R
See application file for complete search history.

(56) References Cited

U.S. PATENT DOCUMENTS

| | | | |
|---|---|---|---|
| 7,656,269 B2 | 2/2010 | Mizoguchi et al. | |
| 2003/0038704 A1* | 2/2003 | Kuzuoka et al. | 338/22 R |
| 2003/0049500 A1 | 3/2003 | Takai et al. | |
| 2006/0186385 A1* | 8/2006 | Chosokabe et al. | 252/521.1 |
| 2009/0016409 A1* | 1/2009 | Mizoguchi et al. | 374/185 |

FOREIGN PATENT DOCUMENTS

| | | | |
|---|---|---|---|
| CN | 101018749 A | 8/2007 | |
| EP | 1564197 A1 | 8/2005 | |
| EP | 1775274 A1 | 4/2007 | |
| EP | 2402297 A1 | 1/2012 | |
| JP | 2007-246381 A | 9/2007 | |
| WO | WO 2006-109792 A1 * | 10/2006 | ........... C04G 45/125 |

OTHER PUBLICATIONS

Extended European Search Report, dated Dec. 5, 2012, issued by the European Patent Office in counterpart European Application No. 11177815.5.

Office Action dated Jul. 26, 2013, issued by the State Intellectual Property Office of the People's Republic of China, in counterpart application No. 201110240876.X.

* cited by examiner

*Primary Examiner* — Khanh Tuan Nguyen
(74) *Attorney, Agent, or Firm* — Sughrue Mion, PLLC

(57) ABSTRACT

A conductive sintered oxide which includes: a conductive crystal phase having a perovskite structure represented by $(RE_{1-c}Sr_c)M_dO_3$, in which RE is a group of elements consisting of Yb and/or Lu and at least one element selected from Group IIIA elements excluding Yb, Lu and La, and M is a group of elements consisting of Al and at least one element selected from Groups IVA, VA, VIA, VIIA and VIII, a first insulating crystal phase represented by $RE_2O_3$, and a second insulating crystal phase represented by $SrAl_2O_4$. The conductive crystal phase has a coefficient c satisfying $0.18 < c < 0.50$ and has a coefficient d satisfying $0.67 \leq d \leq 0.93$. A content of a third insulating crystal phase represented by $RE_4Al_2O_9$, the content of which may be zero, is smaller than the content of each of the first and second insulating crystal phases.

6 Claims, 11 Drawing Sheets

FIG. 2    EXAMPLE 1: ORIGINAL SEM IMAGE
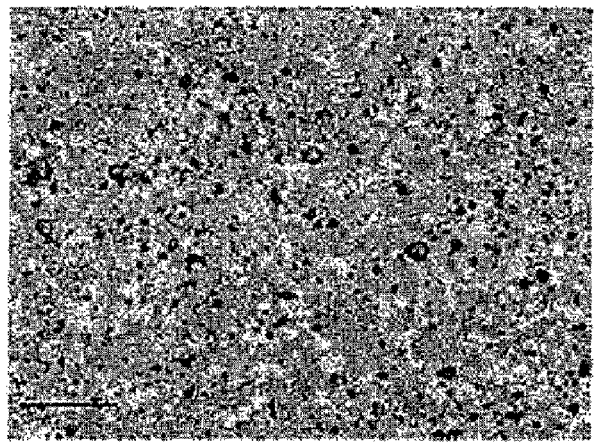
FIG. 3A    EXAMPLE 1: IMAGE OF EXTRACTED RE$_2$O$_3$
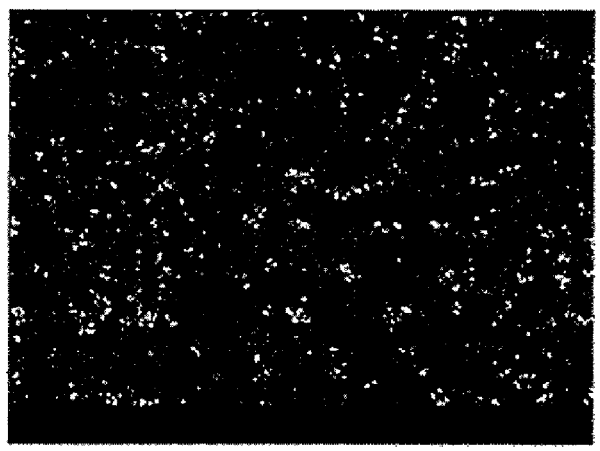
FIG. 3B    EXAMPLE 1: IMAGE OF EXTRACTED SrAl$_2$O$_4$
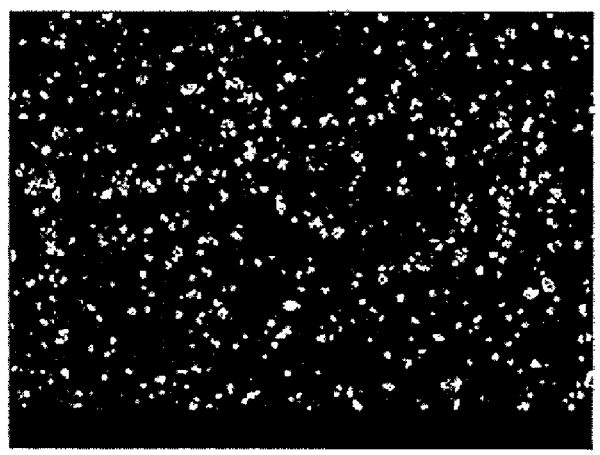

FIG. 4  EXAMPLE 8: ORIGINAL SEM IMAGE
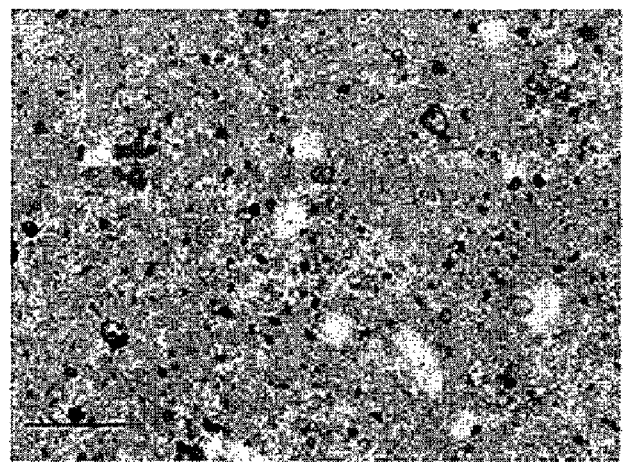

FIG. 5A  EXAMPLE 8: IMAGE OF EXTRACTED RE2O3
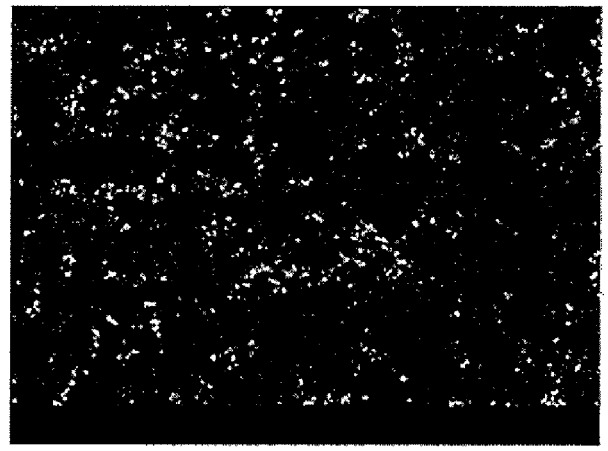
FIG. 5B  EXAMPLE 8: IMAGE OF EXTRACTED SrAl2O4
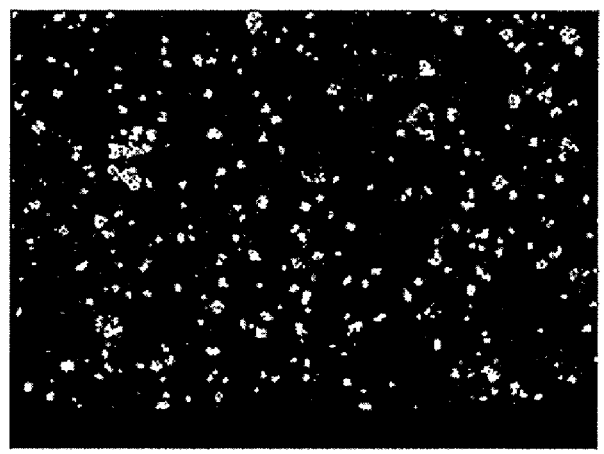
FIG. 5C  EXAMPLE 8: IMAGE OF EXTRACTED RE4Al2O9

FIG. 6    COMPARATIVE EXAMPLE 3: ORIGINAL SEM IMAGE
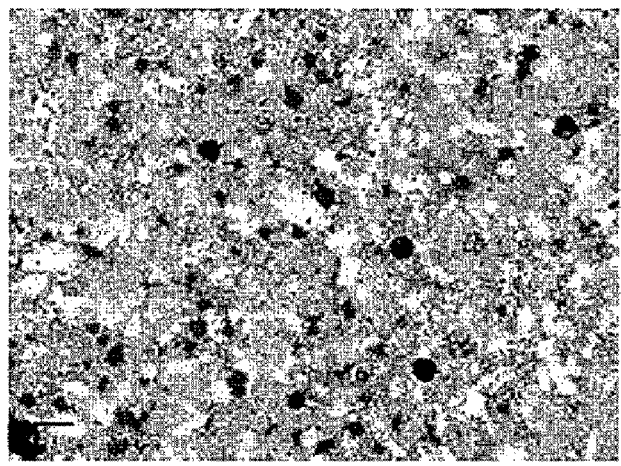

FIG. 7A  COMPARATIVE EXAMPLE 3: IMAGE OF EXTRACTED RE$_2$O$_3$
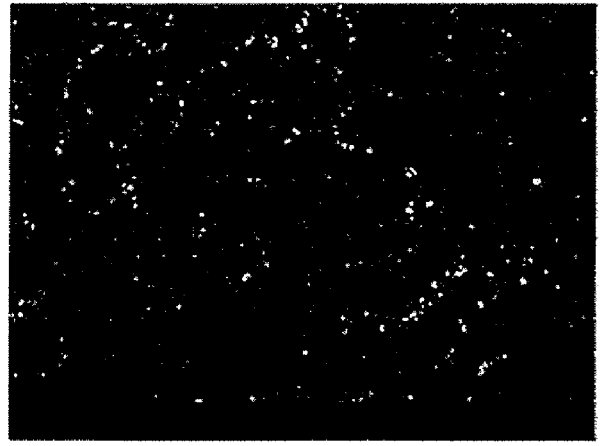
FIG. 7B  COMPARATIVE EXAMPLE 3: IMAGE OF EXTRACTED SrAl$_2$O$_4$
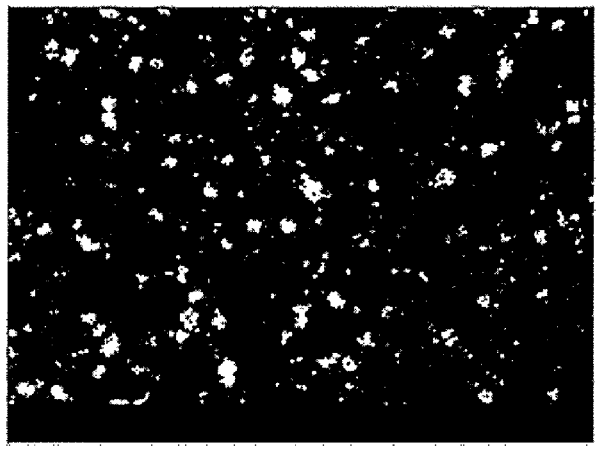
FIG. 7C  COMPARATIVE EXAMPLE 3: IMAGE OF EXTRACTED RE$_4$Al$_2$O$_9$
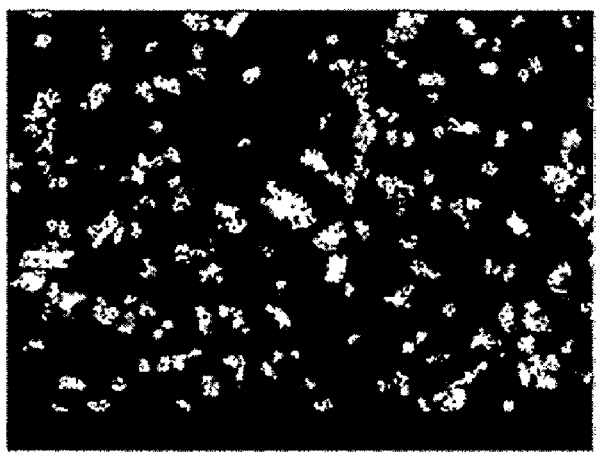

US 8,771,559 B2

CONDUCTIVE SINTERED OXIDE, THERMISTOR ELEMENT INCLUDING THE SAME, AND TEMPERATURE SENSOR INCLUDING THE SAME

BACKGROUND OF THE INVENTION

1. Field of the Invention

The present invention relates to a conductive sintered oxide which has electrically conductive properties and which changes in resistivity with a change in temperature. The invention further relates to a thermistor element including the sintered oxide, and to a temperature sensor including the thermistor element.

2. Description of the Related Art

Applications of thermistor elements and temperature sensors include measurement of exhaust gas temperature from internal-combustion engines such as automobile engines. For use in these applications, temperature sensors are desired not only for temperature measurements in high-temperature regions, but also for detecting low temperatures so that a failure (breakage of wire) of the temperature sensor can be detected with, for example, OBD systems (on-board diagnostic systems) or the like.

Patent document 1 discloses, as a technique for satisfying this need, a conductive sintered oxide which has a temperature gradient constant (constant B) of about 2,000-3,000K.

[Patent Document 1] JP-A-2007-246381

3. Problems to be Solved by the Invention

However, the temperature range to be measured by thermistor elements vary, and there is a need for a thermistor element that has an even lower value of constant B, for example, a constant B of 2,000K or lower, which makes the thermistor element useful over a wider temperature range.

Such a thermistor element is suitably used for temperature measurements in the range of −40° to +600° C., for example, in exhaust gas temperature measurements such as the application described above. In addition, with respect to detection of a failure in a temperature sensor employing such a thermistor element, detection of wire breakage in a lower-temperature region and detection of short-circuiting in a higher-temperature region can be precisely made based on the output of the temperature sensor (thermistor element).

Furthermore, there is a need for such a thermistor element which has stable properties and does not change in resistance with the lapse of time even when exposed to high temperatures (e.g., +600° C.).

SUMMARY OF THE INVENTION

An object of the invention, which has been achieved to meet the above needs, is to provide a conductive sintered oxide allowing for temperature measurements over a wide temperature range and which exhibits a stable resistance even when exposed to high temperatures. Another object of the invention is to provide a thermistor element including the conductive sintered oxide and a temperature sensor including the thermistor element.

The above objects of the invention have been achieved by providing a conductive sintered oxide which comprises a conductive crystal phase having a perovskite structure represented by $(RE_{1-c}Sr_c)M_dO_3$, in which RE is a group of elements consisting of Yb and/or Lu and at least one element selected from Group IIIA excluding Yb, Lu and La, and M is a group of elements consisting of Al and at least one element selected from Groups IVA, VA, VIA, VIIA and VIII, a first insulating crystal phase represented by $RE_2O_3$, in which RE is as defined above, and a second insulating crystal phase represented by $SrAl_2O_4$, wherein the conductive crystal phase has a coefficient c which satisfies $0.18<c<0.50$, the conductive crystal phase has a coefficient d satisfying $0.67 \leq d \leq 0.93$, the coefficient d indicating a ratio between the amount of the element group $(RE_{1-c}Sr_c)$ constituting A sites and the amount of the element group M constituting B sites of the conductive crystal phase, and the content of a third insulating crystal phase represented by $RE_4Al_2O_9$, which content thereof may be zero, is smaller than the content of the first insulating crystal phase and is smaller than the content of the second insulating crystal phase in the conductive sintered oxide.

The conductive sintered oxide described above contains the conductive crystal phase described above.

In this conductive crystal phase, the coefficient c, which indicates a ratio between the amounts of the element group RE and Sr in the A sites $(RE_{1-c}Sr_c)$, is in the range of $0.18<c<0.50$. When the amount of Sr in the A sites is small and the coefficient c is $c \leq 0.18$, there are then cases where the conductive sintered oxide has an increased value of constant B which exceeds 2,000K. On the other hand, in the case where the amount of Sr in the A sites is too large and the coefficient c is too large ($c \geq 0.5$), it is difficult for the conductive crystal phase to retain a perovskite structure.

In contrast, in the conductive sintered oxide of the invention, a constant B of 2,000K or less can be attained while the conductive crystal phase retains the perovskite structure. This is because the coefficient c is in the range of $0.18<c<0.50$.

In addition, in the conductive crystal phase of the conductive sintered oxide, the coefficient d, which indicates a ratio between the amount of the element group constituting the A sites and the amount of the element group constituting the B sites, satisfies $0.67 \leq d \leq 0.93$. Namely, the amount of the element group which constitutes the B sites is small (there is a deficiency) as compared with the element group constituting the A sites. In addition, the deficiency is somewhat large.

In the case where the coefficient d exceeds 0.93, there is a tendency that this conductive sintered oxide, when continuously used in a high-temperature region, suffers a larger change in resistance R (e.g., R(600)) with the lapse of time. Specifically, when this conductive sintered oxide is allowed to stand for 400 hours in a high-temperature environment of +600° C. (i.e., R(600)), the rate of resistance change ΔR becomes ΔR>1.0%. On the other hand, in the case where the coefficient d is smaller than 0.67, the perovskite structure of this conductive sintered oxide is unstable and a change in crystal structure is apt to occur.

In contrast, by setting the coefficient d in the range of $0.67 \leq d \leq 0.93$, a variation in properties of the conductive sintered oxide can be inhibited while also inhibiting the conductive sintered oxide from changing in resistance R at high temperatures with the lapse of time. For example, a rate of resistance change ΔR of 1.0% or less can be attained.

Furthermore, the conductive sintered oxide contains a first insulating crystal phase represented by $RE_2O_3$ and a second insulating crystal phase represented by $SrAl_2O_4$, and the content of a third insulating crystal phase represented by $RE_4Al_2O_9$ (the content of which may be zero) is smaller than the content of the first insulating crystal phase and is smaller than the content of the second insulating crystal phase. Namely, the third insulating crystal phase is not present in the conductive sintered oxide or is present in a smaller amount than the first insulating crystal phase and in a smaller amount than the second insulating crystal phase.

Like the conductive crystal phase, the third insulating crystal phase contains RE and Al. Because of this, the third insulating crystal phase competes for Al with the conductive crystal phase, and the B sites of the conductive crystal phase are apt to be deprived of Al by the third insulating crystal phase when this sintered oxide is exposed to a high-temperature environment. It is thought that the conductive crystal phase, when deprived of Al and thereby changed in composition, also exhibits a change in resistance characteristics. It is therefore presumed that when the third insulating crystal phase, which is apt to deprive the conductive crystal phase of Al, is present in a large amount, the conductive sintered oxide undergoes a larger change in resistance R (e.g., R(600)) with the lapse of time (rate of resistance change $\Delta R$) due to continuous use in a high-temperature region.

Incidentally, the tendency that larger values of coefficient d are apt to result in larger changes in resistance with the lapse of time in a high-temperature region is presumed to occur because the larger the coefficient d, the more the B sites are apt to be deprived of Al.

In contrast, in the conductive sintered oxide of the invention, the third insulating crystal phase is not present or is present in a smaller amount than the first insulating crystal phase and in a smaller amount than the second insulating crystal phase, as stated above. Because of this, the conductive crystal phase is less apt to undergo a change in composition due to the presence of the third insulating crystal phase, and is less apt to undergo a change in resistance R (e.g., R(600)) with the lapse of time when continuously used in a high-temperature region.

Consequently, the conductive sintered oxide of the invention, which has the properties described above, not only can be used for suitably measuring temperature over a wide range, but also exhibits a stable value of resistance even when exposed to high temperatures.

The element group RE is a group of elements consisting of Yb and/or Lu and at least one element selected from Group IIIA (Group 3 new IUPAC numbering) of the periodic table excluding Yb, Lu and La. Examples thereof include a combination of Yb and Y, a combination of Lu and Y, and a combination of Yb, Lu and Y.

The presence of the conductive crystal phase (crystal phase having a perovskite-type crystal structure) can be ascertained by an X-ray diffraction method based on the presence of peaks characteristic of crystals having the same crystal system and a similar composition, and the presence of the same elements as in that crystal phase.

The coefficient d is a coefficient which indicates the molar ratio between the element group $(RE_{1-c}Sr_c)$ constituting the A sites and the element group M constituting the B sites in the empirical formula $(RE_{1-c}Sr_c)M_dO_3$, as stated above. In crystal structures which essentially are of the perovskite type, the molar ratio between the A-site element group and the B-site element group should be 1:1. However, in the conductive sintered oxide described above, the coefficient d is less than 1. This indicates that the conductive crystal phase is deficient in the B-site element group as compared with the A-site element group (the B-side element group is present in a smaller amount than the A-site element group). In this case also, the conductive crystal phase may have such properties so long as the perovskite-type crystal structure is maintained.

There also are cases where an oxygen excess or deficiency results from firing conditions (e.g., oxidizing, reducing, or another firing atmosphere and firing temperature) used for producing the conductive sintered oxide or from the proportion in which an A-site element and a B-site element are substituted by each other. Consequently, the molar ratio of oxygen atoms to the A-site elements $(RE_{1-c}Sr_c)$ in the empirical formula shown above need not be exactly 3:1 so long as the perovskite-type crystal structure is maintained.

The coefficient c of the conductive crystal phase is preferably c≥0.20. In this case, the constant B (−40 to 600° C.) can be further reduced to 1,900K or below.

More preferably, the coefficient c of the conductive crystal phase is c≥0.21. In this case, the constant B (−40 to 600° C.) can be further reduced to 1,800K or below.

The conductive sintered oxide is also preferably a conductive sintered oxide in which in a cross-section of the conductive sintered oxide, the ratio of the areal proportion of the third insulating crystal phase Si3 to the areal proportion of the conductive crystal phase Sc, Si3/Sc (%), satisfies Si3/Sc≤6.0 (%).

The conductive sintered oxide has a cross-section in which the ratio of the areal proportion of the third insulating crystal phase Si3 to the areal proportion of the conductive crystal phase Sc is adjusted so as to satisfy Si3/Sc≤6.0(%). By regulating the amount of the third insulating crystal phase generated in the sintered oxide to such a small value, the conductive crystal phase is rendered less apt to undergo a change in composition due to the third insulating crystal phase. Also, a change in resistance R (e.g., R(600)) of the conductive sintered oxide can be inhibited with the lapse of time when continuously used in a high-temperature region. The change in resistance R with the lapse of time can be further inhibited in a high-temperature region. For example, the rate of resistance change $\Delta R$ through 400-hour standing in a high-temperature environment of +600° C. can be reduced to 1.0% or less.

The areal ratio Si3/Sc preferably satisfies Si3/Sc≤2.0(%). As a result, a change in resistance R of the conductive sintered oxide can especially be inhibited with the lapse of time in a high-temperature region. For example, the rate of resistance change $\Delta R$ after having been subjected to 400-hour standing in a high-temperature environment of +600° C. can be reduced to 0.50% or less.

The conductive sintered oxide described above is desirably a conductive sintered oxide in which the coefficient d satisfies 0.67≤d<0.90.

In the conductive crystal phase of the sintered oxide, the coefficient d satisfies 0.67≤d<0.90. By regulating the coefficient d so as to be in the range of d<0.90, the change in resistance R of the conductive sintered oxide can be inhibited with the lapse of time in a high-temperature region. For example, the rate of resistance change $\Delta R$ after having been subjected to 400-hour standing in a high-temperature environment of +600° C. can be reduced so as to satisfy $\Delta R$≤0.50%.

Also, any of the conductive sintered oxides described above is desirably a conductive sintered oxide in which the element group M includes Al, Mn and Cr, and the conductive crystal phase is represented by $(RE_{1-c}Sr_c)(Al_xMn_yCr_z)O_3$, in which the coefficients x, y, and z (x+y+z=d) satisfy the following.

$0.40 \leq x \leq 0.87$ $0.05 \leq y \leq 0.52$ $0 < z \leq 0.05$

In a preferred conductive sintered oxide of the invention, the B-site element group M in the conductive crystal phase having a perovskite structure ($ABO_3$ structure) includes Al, Mn and Cr. Furthermore, the coefficients x, y and z, which are the molar proportions of these elements in the B sites, have been regulated so as to be within the respective numerical ranges shown above.

Elements Al, Mn and Cr, which occupy the B-sites, are akin to each other in ionic radius, and can be easily substituted by each other. Furthermore, by-products constituted of these elements are less apt to generate, and the conductive crystal phase which has a composition resulting from the substitution can stably exist. Because of this, by continuously changing the composition over a wide range, the resistivity and temperature gradient constant (constant B) of the conductive sintered oxide can be regulated.

The thermistor element of the invention includes any of the conductive sintered oxides described above.

Since the thermistor element includes the conductive sintered oxide described above, the thermistor element has a suitable temperature gradient constant (constant B) which renders temperature measurements possible over a wide range of, for example, −40 to +600° C. In addition, the thermistor element suffers little change in resistance and shows a stable resistance value, even when exposed to high temperatures over a long period of time.

The temperature sensor of the invention includes the thermistor element.

Since the temperature sensor of the invention includes the thermistor element including the conductive sintered oxide described above, the temperature sensor can be used for temperature measurements over a wide range of, for example, −40 to +600° C. In addition, since the thermistor element suffers little change in resistance and shows a stable resistance value even when exposed to high temperatures over a long period of time, the temperature sensor has stable properties.

Consequently, in the case where the temperature sensor is used, for example, for measuring the temperature of an exhaust gas, as described above, the temperature measurement can be precisely and stably made based on the output of the thermistor that is used. In addition, wire breakage detection in a lower-temperature region and short-circuiting detection in a higher-temperature region also can each be precisely and stably made based on the output of the thermistor that is used.

BRIEF DESCRIPTION OF THE DRAWINGS

Illustrative aspects of the invention will be described in detail with reference to the following figures wherein:

FIG. 2 is an original SEM image (reproduction of an original SEM image) of a cross-section of the conductive sintered oxide according to Example 1;

FIG. 3A is an extract image obtained by extracting $RE_2O_3$ portions from the original SEM image of FIG. 2; and FIG. 3B is an extract image likewise obtained by extracting $SrAl_2O_4$ portions;

FIG. 4 is an original SEM image of a cross-section of the conductive sintered oxide according to Example 8;

FIG. 5A is an extract image obtained by extracting $RE_2O_3$ portions from the original SEM image of FIG. 4; FIG. 5B is an extract image likewise obtained by extracting $SrAl_2O_4$ portions; and FIG. 5C is an extract image likewise obtained by extracting $RE_4Al_2O_9$ portions;

FIG. 6 is an original SEM image of a cross-section of the conductive sintered oxide according to Comparative Example 3;

FIG. 7A is an extract image obtained by extracting $RE_2O_3$ portions from the original SEM image of FIG. 6; FIG. 7B is an extract image likewise obtained by extracting $SrAl_2O_4$ portions; and FIG. 7C is an extract image likewise obtained by extracting $RE_4Al_2O_9$ portions;

DESCRIPTION OF REFERENCE NUMERALS AND SIGNS

Figure 1:
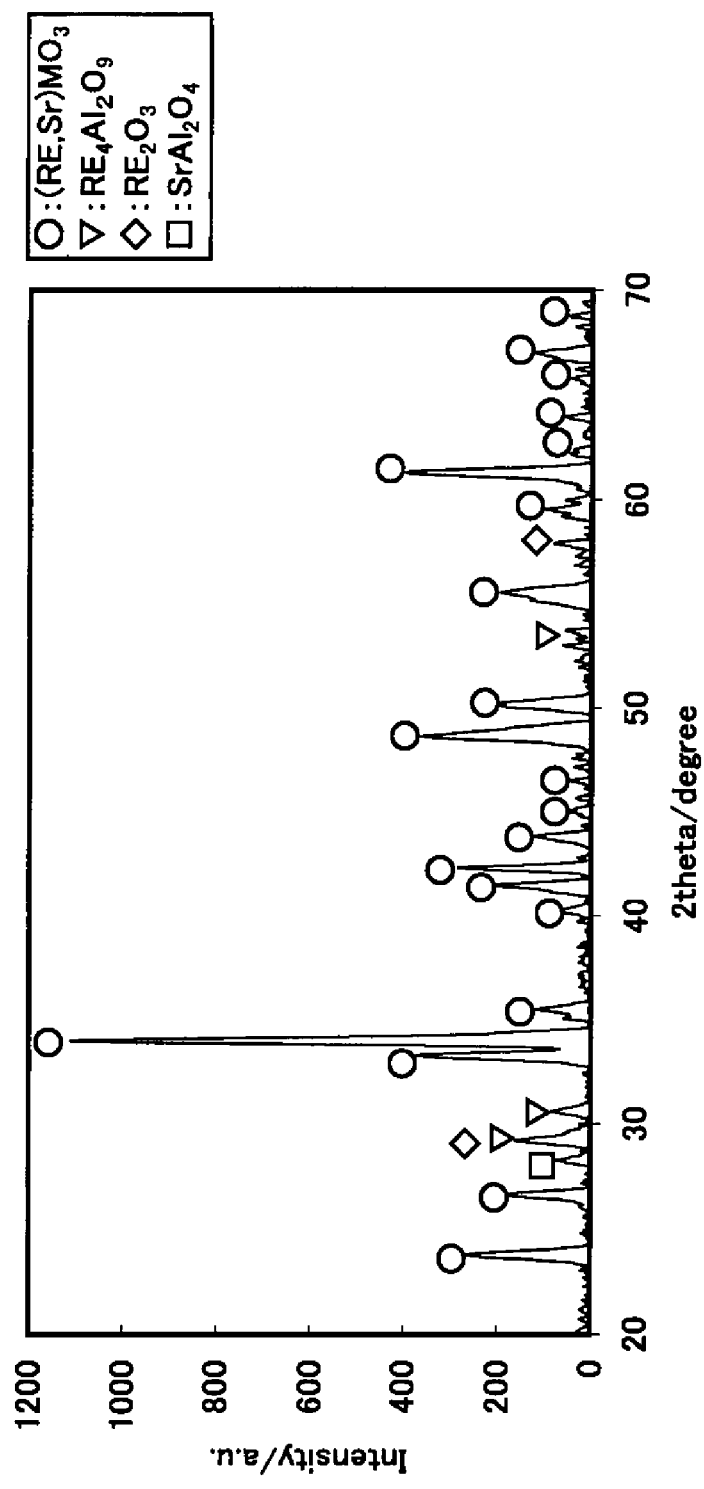
FIG. 1 is a chart showing the results of an examination of the conductive sintered oxide according to Example 8 by an X-ray diffraction method.

Reference numerals used to identify various structural features in the drawings including the following.

| | |
|---|---|
| 1 | Conductive sintered oxide |
| 2 | Thermistor element |
| 2a, 2b | Electrode wire |
| 100 | Temperature sensor |

DETAILED DESCRIPTION OF THE PREFERRED EMBODIMENTS

Examples 1 to 16 for thermistor elements 2 employing conductive sintered oxides 1 according to the invention are explained below in reference to the figures, together with Comparative Examples 1 to 4 for comparison. However, the present invention should not be construed as being limited thereto

EXAMPLES 1 to 16

First, production of conductive sintered oxides 1 and thermistor elements 2 according to Examples 1 to 16 and Comparative Examples 1 to 4 is explained. Powders of $Y_2O_3$, $Yb_2O_3$, $Lu_2O_3$, $SrCO_3$ (shown in terms of SrO in Table 1), $Al_2O_3$, $MnO_2$ and $Cr_2O_3$ were used as starting-material powders (all powders used were commercial products each having a purity of 99% or higher). These starting-material powders were weighed out so as to result in the starting-material feed compositions (mol %) shown in Table 1, and then wet-mixed and dried to thereby prepare a starting-material powder mixture. Subsequently, the starting-material powder mixture was calcined at 1,400° C. for 2 hours in the air to obtain a calcined powder having an average particle diameter of 1-2 μm. Thereafter, a resin pot and high-purity alumina flint pebbles were used to conduct wet mixing/pulverization using ethanol as a dispersion medium.

TABLE 1

| | Starting-material feed composition (mol %) | | | | | | |
|---|---|---|---|---|---|---|---|
| | $Y_2O_3$ | $Yb_2O_3$ | $Lu_2O_3$ | SrO | $Al_2O_3$ | $MnO_2$ | $Cr_2O_3$ |
| Example 1 | 25.16 | 6.45 | — | 17.20 | 34.41 | 16.34 | 0.43 |
| Example 2 | 25.58 | 6.42 | — | 17.11 | 34.22 | 16.25 | 0.43 |
| Example 3 | 26.57 | 6.13 | — | 16.35 | 35.00 | 15.54 | 0.41 |

TABLE 1-continued

| | Starting-material feed composition (mol %) | | | | | | |
|---|---|---|---|---|---|---|---|
| | $Y_2O_3$ | $Yb_2O_3$ | $Lu_2O_3$ | SrO | $Al_2O_3$ | $MnO_2$ | $Cr_2O_3$ |
| Example 4 | 24.32 | 6.24 | — | 16.63 | 36.59 | 15.80 | 0.42 |
| Example 5 | 25.58 | — | 6.42 | 17.11 | 34.22 | 16.25 | 0.43 |
| Example 6 | 26.75 | 6.17 | — | 16.46 | 34.57 | 15.64 | 0.41 |
| Example 7 | 26.19 | 6.36 | — | 16.97 | 33.93 | 16.12 | 0.42 |
| Example 8 | 25.15 | 6.31 | — | 18.50 | 33.64 | 15.98 | 0.42 |
| Example 9 | 25.78 | 6.40 | — | 17.06 | 34.12 | 16.21 | 0.43 |
| Example 10 | 26.49 | 6.11 | — | 16.30 | 35.21 | 15.48 | 0.41 |
| Example 11 | 25.19 | 6.25 | — | 16.66 | 35.66 | 15.83 | 0.42 |
| Example 12 | 25.58 | 3.21 | 3.21 | 17.11 | 34.22 | 16.25 | 0.43 |
| Example 13 | 24.02 | 6.57 | — | 20.53 | 32.85 | 15.61 | 0.41 |
| Example 14 | 26.22 | 6.30 | — | 16.81 | 34.29 | 15.97 | 0.42 |
| Example 15 | 25.93 | 6.30 | — | 16.80 | 34.60 | 15.96 | 0.42 |
| Example 16 | 25.05 | 6.42 | — | 17.13 | 34.26 | 17.13 | — |
| Comparative Example 1 | 27.39 | 6.26 | — | 16.69 | 33.38 | 15.86 | 0.42 |
| Comparative Example 2 | 30.95 | 5.95 | — | 15.87 | 31.75 | 15.08 | 0.40 |
| Comparative Example 3 | 27.89 | 6.44 | — | 17.16 | 32.61 | 15.49 | 0.41 |
| Comparative Example 4 | 26.15 | 6.04 | — | 16.10 | 34.77 | 16.51 | 0.43 |

Subsequently, the resultant slurry was dried at 80° C. for 2 hours to obtain a synthesized thermistor powder. Thereafter, 20 parts by weight of a binder including poly(vinyl butyral) as a main component was added to and mixed with 100 parts by weight of the synthesized thermistor powder. The resultant mixture was dried, subsequently passed through a 250-μm mesh sieve, and granulated to obtain granules.

Useful binders are not limited to poly(vinyl butyral), and examples thereof include poly(vinyl alcohol) and acrylic binders. The amount of the binder to be incorporated is generally 5-20 parts by weight, preferably 10-20 parts by weight, per 100 parts by weight of the calcined powder.

Before being mixed with the binder, the synthesized thermistor powder is preferably regulated so as to have an average particle diameter of 2.0 μm or less. Thus, the ingredients can be evenly mixed.

As Table 1 shows, Example 5 is the same as Example 2, except that $Lu_2O_3$ was used in place of the $Yb_2O_3$ used in Example 2. Meanwhile, Example 12 is the same as Example 2, except that $Yb_2O_3$ and $Lu_2O_3$ were used in the same molar amount in place of the $Yb_2O_3$ used in Example 2. Furthermore, Example 16 employed a composition which included no $Cr_2O_3$ unlike the composition of Example 1, etc.

Furthermore, Comparative Examples 1 to 3 employed a larger $Y_2O_3$ amount relative to the $Al_2O_3$ amount than in the Examples, and thereby employed a larger amount of the element group RE.

Production and Evaluation of Test Samples

Subsequently, the granules were uniaxially pressed at a pressure of 20 MPa to mold the granules into a cylindrical shape having a size of 19 mm (diameter) by 2 mm. Thereafter, CIP (cold isostatic pressing) was conducted at a pressure of 150 MPa. The resultant compact was fired at 1,550° C. for 4 hours in the air. Thus, test samples of conductive sintered oxides according to Examples 1 to 16 and Comparative Examples 1 to 4 were obtained.

Thereafter, a surface of each sample was polished and then subjected to identification of the generated crystal phases using an X-ray diffraction apparatus. The results thereof are shown in Table 2. Furthermore, the sample of Example 8 was examined, as a representative example, for X-ray diffraction. The results thereof are shown (see FIG. 1).

In FIG. 1, the peaks indicated by circle symbols are peaks which agree with the diffraction peak data obtained when the crystal is assumed to be $YAlO_3$. It can be seen that the peak arrangement which is characteristic of a perovskite structure has appeared. It can be ascertained from the results that a conductive crystal phase having a perovskite structure is present in the sintered oxide of Example 8. The reason why peak data for $YAlO_3$ were used is as follows. It is presumed that Yb (or Lu) and Sr are contained in the A sites besides Y, and that Mn and Cr are contained in the B sites besides Al. However, these elements are present as a solid solution at the respective sites. It is therefore thought that so long as a conductive crystal phase of a perovskite structure is present, a pattern which is akin to the pattern of $YAlO_3$ is exhibited.

Furthermore, the crystal phases, in particular, the perovskite-type conductive crystal phase, which is a conductive phase, were subjected to compositional analysis by EPMA/WDS (Electron Probe Microanalysis/Wavelength Dispersive Spectrometry) in the manner described below. As a result, it was ascertained that Yb (or Lu), Sr, Mn, and Cr were present in the perovskite-type conductive crystal phase besides Y and Al. It is therefore thought that the perovskite-type crystal phase in each of these Examples has a composition which is represented not by $YAlO_3$, but by the empirical formula $(RE_{1-c}Sr_c)M_dO_3$.

In the Examples, the element group RE includes Y and further includes Yb or Lu depending on the Examples, and the element group M includes Al and Mn and further includes Cr depending on the Examples.

Furthermore, from the peaks indicated by diamond symbols in FIG. 1, an insulating crystal phase having the crystal structure of $RE_2O_3$ (first insulating crystal phase) also can be ascertained. Incidentally, this first insulating crystal phase also was assumed to be $Yb_2O_3$ and examined for peaks which agreed with peak data for this crystal. The crystal structure was thus determined. Thereafter, it was ascertained by EPMA/WDS that Y was contained in this first insulating crystal phase besides Yb. With respect to the other Examples and the Comparative Examples, it was ascertained, in the same manner, that $RE_2O_3$ was contained as a first insulating crystal phase (see Table 2). With respect to the sintered oxide of Example 5, however, the first insulating crystal phase was assumed to be $Lu_2O_3$ in place of $Yb_2O_3$ and examined for peaks which agreed with peak data for this crystal.

Furthermore, from the peak indicated by a square symbol, the presence of an insulating crystal phase having the crystal structure of $SrAl_2O_4$ (second insulating crystal phase) was ascertained. With respect to other Examples and the Comparative Examples, it was ascertained, in the same manner, that $SrAl_2O_4$ was contained as a second insulating crystal phase (see Table 2).

Moreover, from the peaks indicated by inverted-triangle symbols, an insulating crystal phase having the crystal structure of $RE_4Al_2O_9$ (third insulating crystal phase) was also ascertained. Incidentally, this third insulating crystal phase was assumed to be $Y_4Al_2O_9$ and examined for peaks which agreed with peak data for this crystal. The crystal structure was thus determined. Thereafter, it was ascertained by EPMA/WDS that Al was contained in the third insulating crystal phase besides Y and Yb, which are included in the element group RE. With respect to the other Examples, it was ascertained, in the same manner, that $RE_4Al_2O_9$ was contained as a third insulating crystal phase (see Table 2).

It can be seen from these results that in each of Examples 1 to 16 and Comparative Examples 1 to 4, a first insulating crystal phase constituted of $RE_2O_3$ and a second insulating crystal phase constituted of $SrAl_2O_4$ had been generated in addition to a conductive crystal phase constituted of $(RE_{1-c}Sr_c)M_dO_3$. It can also be seen that a third insulating crystal phase constituted of $RE_4Al_2O_9$ had been generated in some of the Examples and Comparative Examples (Examples 3, 6-9, 13, and 14 and Comparative Examples 1 to 3). It can conversely be seen that in the remainder of the Examples and Comparative Examples (Examples 1, 2, 4, 5, 10-12, 15, and 16 and Comparative Example 4), a third insulating crystal phase constituted of $RE_4Al_2O_9$ was not detected. Namely, it can be seen that the third insulating crystal phase constituted of $RE_4Al_2O_9$ was absent or was present in an amount less than the detection limit (in which case an areal proportion of 0.0 is given in Table 2 below).

As described above, each conductive sintered oxide mainly included a conductive crystal phase and further contained the first insulating crystal phase and second insulating crystal phase described above. Some of the conductive sintered oxides still further contained a third insulating crystal phase.

A surface of the test sample of each of the Examples and Comparative Examples was polished, and the crystal phases, in particular, the perovskite-type crystal phase which is the conductive crystal phase described above, were subjected to compositional analysis (qualitative analysis and quantitative analysis) by EPMA/WDS. The results thereof are shown in Table 2. It was thus found that a combination of elements in the element group RE which were (Y, Yb), (Y, Lu), or (Y, Yb, Lu) was contained together with Sr in the A sites of the perovskite-type conductive crystal phase, and a combination of elements in the element group M which were (Al, Mn, Cr) or (Al, Mn) was contained in the B sites. Furthermore, the proportions of Al, Mn, and Cr, which are represented respectively by x, y and z, were also determined with respect to each of the Examples and Comparative Examples.

It is therefore thought that the perovskite-type conductive crystal phase in each of the Examples and Comparative Examples has a composition represented by $(RE_{1-c}Sr_c)M_dO_3$, more specifically, a composition represented by $(RE_{1-c}Sr_c)(Al_xMn_yCr_z)O_3$.

Incidentally, in the empirical formulae given above and in Table 2, the coefficient c is a value which indicates the ratio between the amount of the element group RE and the amount of Sr in the A sites. The coefficient d indicates the proportion of the elements belonging to the B sites to the elements belonging to the A sites. When the coefficient d is less than 1, this indicates that the amount of the elements belonging to the B sites is relatively small (there is a deficiency in these elements). The coefficient d has a relationship with the coefficients x, y and z, which indicate the proportions of Al, Mn and Cr, the relationship being $x+y+z=d$.

TABLE 2

| | Conductive crystal phase: perovskite-type crystal phase $[(RE_{1-c}Sr_c)M_dO_3]$ | | | | | | | Areal proportion (%) | | | | Areal ratio |
| | A sites | | | B sites | | | | | Conductive crystal phase | Insulating crystal phases | | | Si3/Sc |
| | RE | 1 − c | c | M | x | y | z | d (=x + y + z) | Sc | $RE_2O_3$ Si1 | $SrAl_2O_4$ Si2 | $RE_4Al_2O_9$ Si3 | (%) |
|---|---|---|---|---|---|---|---|---|---|---|---|---|---|
| Example 1 | Y, Yb | 0.81 | 0.19 | $Al_xMn_yCr_z$ | 0.66 | 0.20 | 0.01 | 0.87 | 77.30 | 11.7 | 11.0 | 0.0 | 0.0 |
| Example 2 | Y, Yb | 0.78 | 0.22 | $Al_xMn_yCr_z$ | 0.63 | 0.25 | 0.01 | 0.88 | 78.20 | 10.8 | 11.0 | 0.0 | 0.0 |
| Example 3 | Y, Yb | 0.80 | 0.20 | $Al_xMn_yCr_z$ | 0.65 | 0.22 | 0.01 | 0.88 | 73.90 | 12.7 | 12.8 | 0.6 | 0.8 |
| Example 4 | Y, Yb | 0.81 | 0.19 | $Al_xMn_yCr_z$ | 0.55 | 0.18 | 0.01 | 0.74 | 74.50 | 12.5 | 13.0 | 0.0 | 0.0 |
| Example 5 | Y, Lu | 0.77 | 0.23 | $Al_xMn_yCr_z$ | 0.63 | 0.26 | 0.01 | 0.89 | 77.70 | 11.5 | 10.8 | 0.0 | 0.0 |
| Example 6 | Y, Yb | 0.79 | 0.21 | $Al_xMn_yCr_z$ | 0.66 | 0.24 | 0.01 | 0.91 | 76.70 | 11.3 | 10.4 | 1.6 | 2.1 |
| Example 7 | Y, Yb | 0.75 | 0.25 | $Al_xMn_yCr_z$ | 0.62 | 0.27 | 0.01 | 0.90 | 75.60 | 9.7 | 12.4 | 2.3 | 3.0 |
| Example 8 | Y, Yb | 0.68 | 0.32 | $Al_xMn_yCr_z$ | 0.59 | 0.30 | 0.01 | 0.90 | 75.70 | 10.2 | 10.9 | 3.2 | 4.2 |
| Example 9 | Y, Yb | 0.76 | 0.24 | $Al_xMn_yCr_z$ | 0.63 | 0.26 | 0.01 | 0.89 | 75.90 | 11.8 | 11.4 | 0.9 | 1.2 |
| Example 10 | Y, Yb | 0.81 | 0.19 | $Al_xMn_yCr_z$ | 0.65 | 0.21 | 0.01 | 0.87 | 78.50 | 11.2 | 10.3 | 0.0 | 0.0 |
| Example 11 | Y, Yb | 0.81 | 0.19 | $Al_xMn_yCr_z$ | 0.60 | 0.20 | 0.01 | 0.81 | 75.60 | 12.0 | 12.4 | 0.0 | 0.0 |
| Example 12 | Y, Yb, Lu | 0.77 | 0.23 | $Al_xMn_yCr_z$ | 0.63 | 0.25 | 0.01 | 0.88 | 79.10 | 10.2 | 10.7 | 0.0 | 0.0 |
| Example 13 | Y, Yb | 0.60 | 0.40 | $Al_xMn_yCr_z$ | 0.57 | 0.33 | 0.01 | 0.91 | 73.40 | 11.4 | 11.1 | 4.1 | 5.6 |
| Example 14 | Y, Yb | 0.76 | 0.24 | $Al_xMn_yCr_z$ | 0.62 | 0.25 | 0.01 | 0.88 | 74.20 | 11.1 | 14.0 | 0.7 | 0.9 |
| Example 15 | Y, Yb | 0.80 | 0.20 | $Al_xMn_yCr_z$ | 0.64 | 0.22 | 0.01 | 0.86 | 76.00 | 10.7 | 13.3 | 0.0 | 0.0 |
| Example 16 | Y, Yb | 0.78 | 0.22 | $Al_xMn_y$ | 0.63 | 0.24 | — | 0.87 | 76.70 | 12.0 | 11.3 | 0.0 | 0.0 |
| Comparative Example 1 | Y, Yb | 0.72 | 0.28 | $Al_xMn_yCr_z$ | 0.66 | 0.27 | 0.01 | 0.94 | 73.30 | 6.2 | 9.6 | 10.9 | 14.9 |
| Comparative Example 2 | Y, Yb | 0.70 | 0.30 | $Al_xMn_yCr_z$ | 0.67 | 0.29 | 0.01 | 0.97 | 71.40 | 6.5 | 7.8 | 14.3 | 20.0 |
| Comparative Example 3 | Y, Yb | 0.71 | 0.29 | $Al_xMn_yCr_z$ | 0.67 | 0.28 | 0.01 | 0.95 | 70.50 | 5.9 | 11.9 | 11.7 | 16.6 |
| Comparative Example 4 | Y, Yb | 0.85 | 0.15 | $Al_xMn_yCr_z$ | 0.70 | 0.15 | 0.01 | 0.86 | 77.10 | 6.0 | 16.9 | 0.0 | 0.0 |

Furthermore, with respect to the polished surface of the test sample of each of the Examples and Comparative Examples, a backscattered electron image was taken by means of an SEM (see, for example, FIG. 2, FIG. 4, and FIG. 6 with respect to Examples 1 and 8 and Comparative Example 3). The conductive crystal phase and the insulating crystal phases give a black-and-white contrast (dark areas and light areas) in the backscattered electron image (original image) depending on a difference in composition (difference in atomic number between the elements contained). Namely, the higher the content of a heavy element in an area, the whiter the image of the area.

For example, in FIG. 4, which shows the test sample of Example 8, the white small spots indicate the first insulating crystal phase having a composition represented by $RE_2O_3$. This is because the first insulating crystal phase contains Y, Yb and Lu, which are heavy elements, in a large amount. Also in FIG. 4, the dark gray spots indicate the second insulating crystal phase having a composition represented by $SrAl_2O_4$. This is because this crystal phase contains none of Y, Yb and Lu, which are heavy elements, and is constituted of Sr and Al, which are relatively lightweight elements. Furthermore, also in FIG. 4, the relatively large white massive areas indicate the third insulating crystal phase having a composition represented by $RE_4Al_2O_9$. This is because this crystal phase contains Y, Yb and Lu, which are heavy elements, in a large amount like the first insulating crystal phase. The background in FIG. 4, which appears to be light gray, indicates the conductive crystal phase having a composition represented by $(RE_{1-c}Sr_c)(Al_xMn_yCr_z)O_3$. This is because this crystal phase contains Y, Yb and Lu, which are heavy elements, but the proportion of these elements (element group RE) in the crystal phase is lower than in the first insulating crystal phase and the third insulating crystal phase.

The black spots indicate pores.

With respect to the data on the backscattered electron image in each of the Examples and Comparative Examples, only the parts corresponding to each phase were extracted on the basis of the degree of lightness or darkness of the phase, using image processing software (WIN ROOF (trademark); manufactured by MITANI CORPORATION).

Specifically, with respect to the image of FIG. 2, which shows the test sample of Example 1, the first insulating crystal phase having a composition represented by $RE_2O_3$ was extracted as shown in FIG. 3A, and the areal proportion Si1 thereof was determined. Furthermore, the second insulating crystal phase having a composition represented by $SrAl_2O_4$ was extracted as shown in FIG. 3B, and the areal proportion Si2 thereof was determined. In the sample of Example 1, the third insulating crystal phase having a composition represented by $RE_4Al_2O_9$ was not observed (an areal proportion Si3 of 0.0 is given in Table 2). The areal proportion of the remaining parts was taken as the areal proportion Sc of the conductive crystal phase having a composition represented by $(RE_{1-c}Sr_c)(Al_xMn_yCr_z)O_3$.

Likewise, with respect to the sintered-oxide sample of Example 8, the first insulating crystal phase was extracted as shown in FIG. 5A, and the second insulating crystal phase was extracted as shown in FIG. 5B. The third insulating crystal phase was also extracted as shown in FIG. 5C. Moreover, the remaining parts were taken as the conductive crystal phase. From these extract images, the areal proportions of the respective phases Sc, Si1, Si2 and Si3 were obtained.

In this sample of Example 8, the third insulating crystal phase having a composition represented by $RE_4Al_2O_9$ is present as described above.

Likewise, with respect to the sintered-oxide sample of Comparative Example 3, the first insulating crystal phase, second insulating crystal phase, and third insulating crystal phase were extracted as shown in FIG. 7A, FIG. 7B and FIG. 7C, and the remaining parts were taken as the conductive crystal phase. The areal proportions of the respective phases Sc, Si1, Si2 and Si3 were obtained.

Table 2 shows the areal proportions of the respective phases with respect to each of the Examples and Comparative Examples.

Table 2 further shows the ratio (Si3/Sc) of the areal proportion Si3 of the third insulating crystal phase having a composition represented by $RE_4Al_2O_9$ to the areal proportion Sc of the conductive crystal phase having a composition represented by $(RE_{1-c}Sr_c)(Al_xMn_yCr_z)O_3$.

Production of Thermistor Elements

Figure 11:
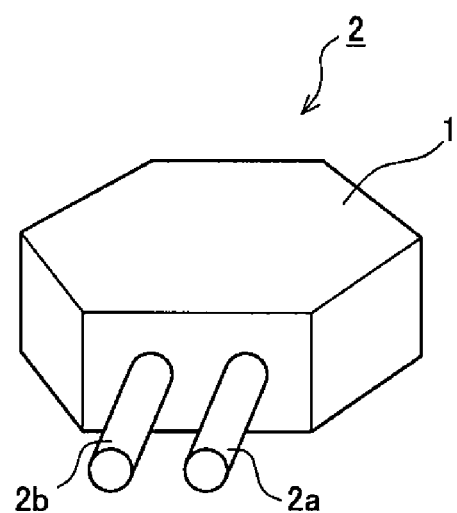
FIG. 11 is a view illustrating the shape of a thermistor element according to the Examples.

Separately from the production of test samples described above, thermistor elements were produced in the following manner. The granules described above were press-molded using a mold (pressing pressure, 440 MPa (=4,500 kg/cm²)) to obtain a green compact in the shape of a hexagonal plate (thickness, 1.24 mm) in which ends of a pair of electrode wires 2a and 2b made of a Pt—Rh alloy had been embedded, as shown in FIG. 11. Thereafter, the compact was fired at 1,550° C. for 4 hours in the air and then annealed (heat-treated) at 800° C. for 24 hours in the air. Thus, thermistor elements 2 of Examples 1 to 16 were produced. Thermistor elements according to Comparative Examples 1 to 4 also were produced in the same manner.

The thermistor elements 2 each had a hexagonal shape with a side length of 1.15 mm and had a thickness of 1.00 mm. The electrode wires 2a and 2b had a diameter of 0.3 mm, and the distance between the electrode centers was 0.74 mm (gap, 0.44 mm). The electrode insertion depth was 1.10 mm.

Subsequently, the thermistor elements 2 of Examples 1 to 16 and Comparative Examples 1 to 4 were examined for constant B (temperature gradient constant) in the following manner. First, each thermistor element 2 was allowed to stand in an environment of T(−40)=233K (−40° C.), and the initial resistance R(−40) of the thermistor element 2 in this state was measured. Subsequently, this thermistor element 2 was allowed to stand in an environment of T(600)=873K (=600° C.), and the initial resistance R(600) of the thermistor element 2 in this state was measured. The constant B (B(−40 to 600)) was calculated using the following equation (1).

$$B(-40 \text{ to } 600) = \ln[R(600)/R(-40)]/[1/T(600)-1/T(-40)] \quad (1)$$

In equation (1), R(−40) is the resistance (kΩ) of the thermistor element at −40° C., and R(600) is the resistance (kΩ) of the thermistor element at +600° C.

The results of the determination of R(−40), R(600), and B(−40 to 600) with respect to each of the Examples and Comparative Examples are shown in Table 3.

TABLE 3

|  | R(−40) (kΩ) | R(600) (kΩ) | B(−40 to 600) (K) | ΔR (%) |
|---|---|---|---|---|
| Example 1 | 19.58 | 0.045 | 1931 | 0.05 |
| Example 2 | 12.25 | 0.046 | 1775 | 0.14 |
| Example 3 | 24.44 | 0.070 | 1861 | 0.21 |
| Example 4 | 36.94 | 0.082 | 1942 | −0.02 |
| Example 5 | 13.33 | 0.051 | 1769 | 0.16 |
| Example 6 | 11.58 | 0.045 | 1764 | 0.51 |
| Example 7 | 9.39 | 0.040 | 1735 | 0.60 |
| Example 8 | 3.52 | 0.021 | 1628 | 0.76 |
| Example 9 | 11.83 | 0.051 | 1731 | 0.32 |
| Example 10 | 27.67 | 0.064 | 1929 | 0.03 |
| Example 11 | 30.24 | 0.074 | 1911 | 0.01 |
| Example 12 | 12.66 | 0.048 | 1772 | 0.15 |
| Example 13 | 2.63 | 0.018 | 1584 | 0.91 |
| Example 14 | 11.58 | 0.046 | 1757 | 0.27 |
| Example 15 | 16.81 | 0.050 | 1849 | 0.18 |
| Example 16 | 8.31 | 0.033 | 1757 | 0.11 |
| Comparative Example 1 | 6.67 | 0.031 | 1707 | 1.49 |
| Comparative Example 2 | 4.02 | 0.023 | 1641 | 3.87 |
| Comparative Example 3 | 4.21 | 0.022 | 1670 | 1.82 |
| Comparative Example 4 | 69.04 | 0.056 | 2262 | 0.08 |

Furthermore, the thermistor elements 2 of Examples 1 to 16 and Comparative Examples 1 to 4 each were examined for a change in resistance R(600) after having been subjected to a high-temperature (specifically, +600° C.) standing test, and the rate of resistance change ΔR (%) was calculated in the following manner. First, each thermistor element 2 was allowed to stand in an environment of T(600)=873K (=600° C.), and the initial resistance R0(600) of the thermistor element 2 in this state was measured. Subsequently, this thermistor element 2 was allowed to stand in a +600° C. environment for a period of 400 hours, and the resistance R1(600) of the thermistor element 2 in this state was measured thereafter. The rate of resistance change ΔR was then calculated using the following equation (2).

$$\Delta R = (R1(600) - R0(600))/R0(600) \cdot 100 \quad (2)$$

The results of the determination of the rate of resistance change ΔR with respect to each of the Examples and Comparative Examples are also shown in Table 3.

It can be seen from Table 2 and Table 3 that the conductive sintered oxides of Examples 1 to 16 each contained a conductive crystal phase having a perovskite structure represented by $(RE_{1-c}Sr_c)M_dO_3$, in which RE is a group of elements consisting of Yb and/or Lu and at least one element selected from Group IIIA (Group 3 new IUPAC numbering) excluding Yb, Lu and La, and M is a group of elements consisting of Al and at least one element selected from the Groups IVA, VA, VIA, VIIA and VIII (Groups 4 to 10 new IUPAC numbering).

In the Examples, the element group RE specifically is a combination of Yb and Y, a combination of Lu and Y, or a combination of Yb, Lu and Y. The element group M specifically is a combination of Al, Mn, and Cr or a combination of Al and Mn.

In each of the sintered oxides according to the Examples, the coefficient c for the A sites of the conductive crystal phase is in the range of 0.18<c<0.50.

Of the results given in Table 2 and Table 3 above, the values of coefficient c and constant B (B(−40 to 600)) for the sintered oxides and thermistor elements of the Examples and Comparative Examples are given again in Table 4. A relationship between these two properties is shown in FIG. 8 as a scatter diagram.

TABLE 4

| | c | B(−40 to 600) (K) |
|---|---|---|
| Example 1 | 0.19 | 1931 |
| Example 2 | 0.22 | 1775 |
| Example 3 | 0.20 | 1861 |
| Example 4 | 0.19 | 1942 |
| Example 5 | 0.23 | 1769 |
| Example 6 | 0.21 | 1764 |
| Example 7 | 0.25 | 1735 |
| Example 8 | 0.32 | 1628 |
| Example 9 | 0.24 | 1731 |
| Example 10 | 0.19 | 1929 |
| Example 11 | 0.19 | 1911 |
| Example 12 | 0.23 | 1772 |
| Example 13 | 0.40 | 1584 |
| Example 14 | 0.24 | 1757 |
| Example 15 | 0.20 | 1849 |
| Example 16 | 0.22 | 1757 |
| Comparative Example 1 | 0.28 | 1707 |
| Comparative Example 2 | 0.30 | 1641 |
| Comparative Example 3 | 0.29 | 1670 |
| Comparative Example 4 | 0.15 | 2262 |

Figure 8:
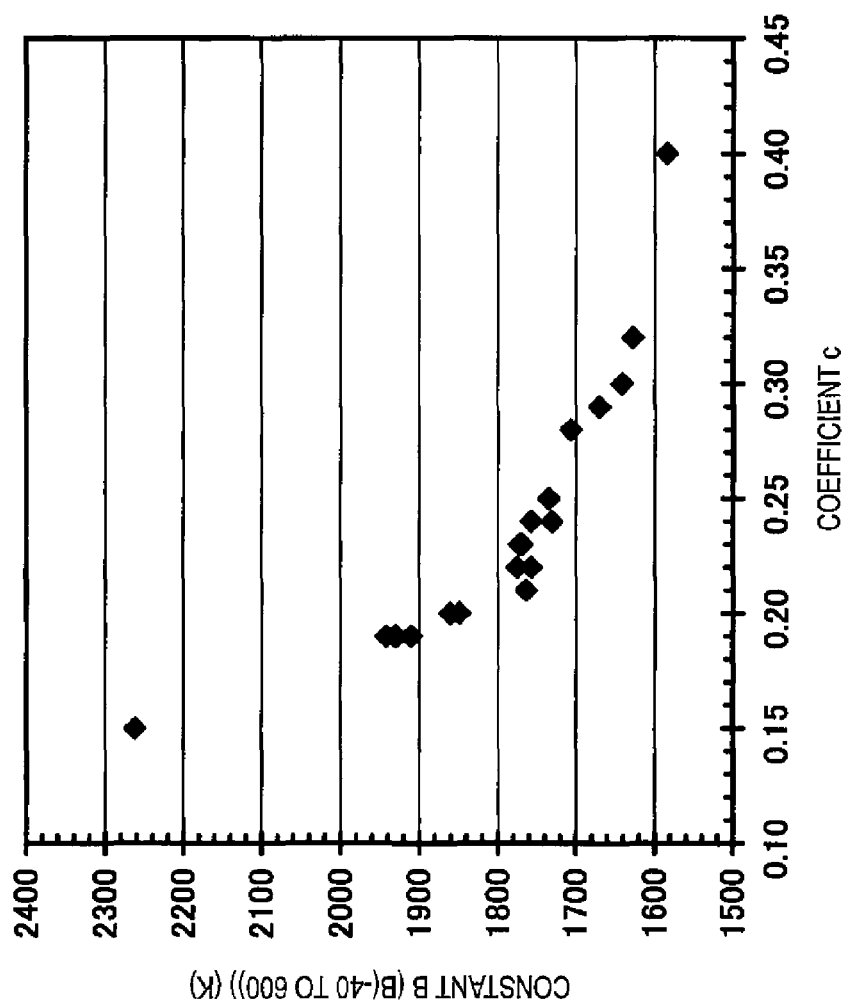
FIG. 8 is a graph showing a relationship between coefficient c and constant B (B(−40 to 600)) with respect to the Examples and the Comparative Examples.

It can be seen from Table 4 and the scatter diagram of FIG. 8 that the sintered oxides of the Examples and Comparative Examples each exhibit a tendency that the larger the coefficient c, the smaller the constant B. Specifically, it can be seen that the coefficient c should be c>0.18 in order that the constant B (B(−40 to 600)) might satisfy B(−40 to 600)≤2000 (K). It can also be seen that the coefficient c should be c≥0.20 in order that the constant B (B(−40 to 600)) might satisfy B(−40 to 600)≤1900 (K). In particular, it can be seen that the coefficient c should be c≥0.21 in order that the constant B (B(−40 to 600)) might satisfy B(−40 to 600)≤1800 (K).

Furthermore, in each of the sintered oxides of the Examples, the coefficient d for the B sites of the conductive crystal phase is in the range of 0.67≤d≤0.93.

Of the results given in Table 2 and Table 3 above, the values of coefficient d and rate of resistance change ΔR for the sintered oxides and thermistor elements of the Examples and Comparative Examples are given again in Table 5. A relationship between these two properties is shown in FIG. 9 as a scatter diagram.

TABLE 5

| | d (=x + y + z) | ΔR (%) |
|---|---|---|
| Example 1 | 0.87 | 0.05 |
| Example 2 | 0.88 | 0.14 |
| Example 3 | 0.88 | 0.21 |
| Example 4 | 0.74 | −0.02 |
| Example 5 | 0.89 | 0.16 |
| Example 6 | 0.91 | 0.51 |
| Example 7 | 0.90 | 0.60 |
| Example 8 | 0.90 | 0.76 |
| Example 9 | 0.89 | 0.32 |
| Example 10 | 0.87 | 0.03 |
| Example 11 | 0.81 | 0.01 |
| Example 12 | 0.88 | 0.15 |
| Example 13 | 0.91 | 0.91 |
| Example 14 | 0.88 | 0.27 |
| Example 15 | 0.86 | 0.18 |
| Example 16 | 0.87 | 0.11 |
| Comparative Example 1 | 0.94 | 1.49 |
| Comparative Example 2 | 0.97 | 3.87 |
| Comparative Example 3 | 0.95 | 1.82 |
| Comparative Example 4 | 0.86 | 0.08 |

Figure 9:
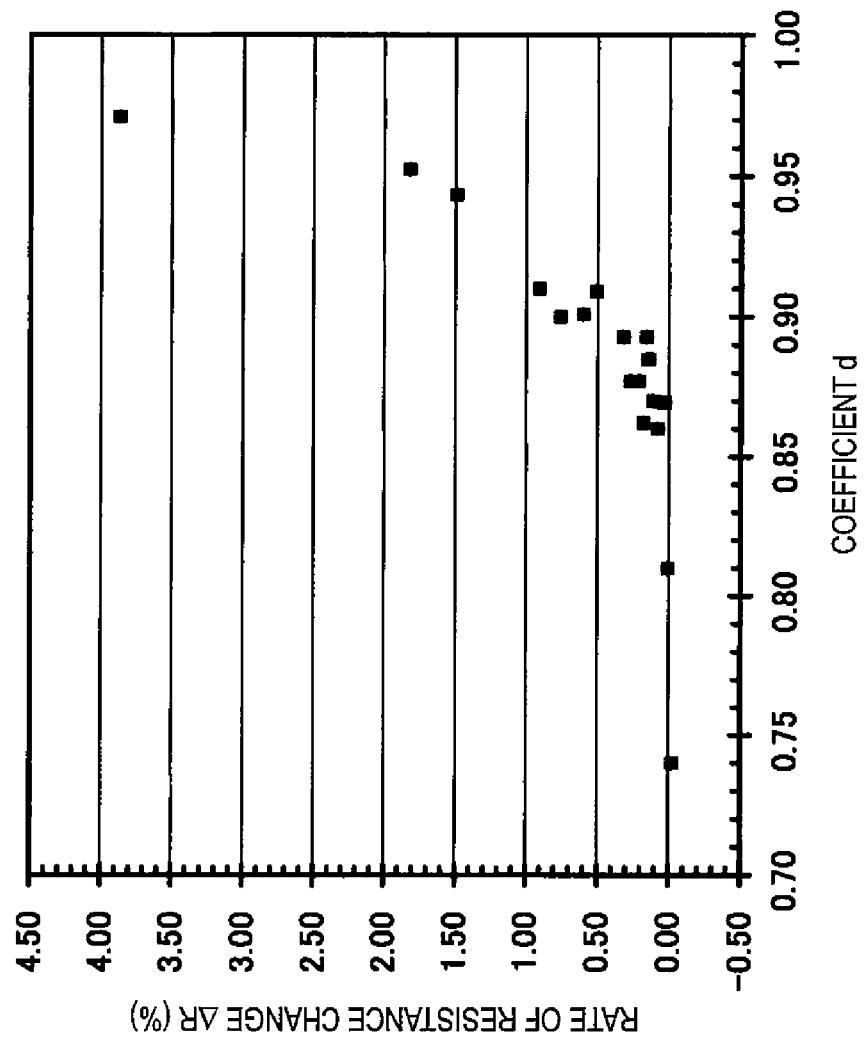
FIG. 9 is a graph showing a relationship between coefficient d and the rate of resistance change ΔR with respect to the Examples and the Comparative Examples.

It can be seen from Table 5 and the scatter diagram of FIG. 9 that the sintered oxides of the Examples and Comparative Examples each exhibit a tendency that the larger the coefficient d, the higher the rate of resistance change ΔR. Specifically, it can be seen that the coefficient d should be d≤0.93 in order that the rate of resistance change ΔR might be 1.0% or less (ΔR≤1.0). It can also be seen that the coefficient d should be d<0.90 in order that ΔR≤0.50(%).

In addition, Table 2 shows that in each of the sintered oxides of the Examples, the areal proportion Si3 of the third insulating crystal phase is smaller than the areal proportion Si1 of the first insulating crystal phase and is smaller than the areal proportion Si2 of the second insulating crystal phase. Namely, Si3<Si1 and Si3<Si2.

Incidentally, the contents of the respective phases are equal to the areal proportions Si1, Si2, Si3 and Sc of the respective phases obtained from the original SEM image described above. Consequently, it can be considered that the content of the third insulating crystal phase (which may be 0) is smaller than the content of the first insulating crystal phase and is smaller than the content of the second insulating crystal phase.

Furthermore, in each of the Examples, the areal ratio Si3/Sc is relatively small. In contrast, in each of Comparative Examples 1 to 3, that ratio is a large value, and the rate of resistance change ΔR in this case is high. Of the results given in Table 2 and Table 3 above, the values of areal ratio Si3/Sc and rate of resistance change ΔR for the sintered oxides and thermistor elements of the Examples and Comparative Examples are hence given again in Table 6. A relationship between these two properties is shown in FIG. 10 as a scatter diagram.

TABLE 6

|  | Areal ratio Si3/Sc (%) | ΔR (%) |
| --- | --- | --- |
| Example 1 | 0.0 | 0.05 |
| Example 2 | 0.0 | 0.14 |
| Example 3 | 0.8 | 0.21 |
| Example 4 | 0.0 | −0.02 |
| Example 5 | 0.0 | 0.16 |
| Example 6 | 2.1 | 0.51 |
| Example 7 | 3.0 | 0.60 |
| Example 8 | 4.2 | 0.76 |
| Example 9 | 1.2 | 0.32 |
| Example 10 | 0.0 | 0.03 |
| Example 11 | 0.0 | 0.01 |
| Example 12 | 0.0 | 0.15 |
| Example 13 | 5.6 | 0.91 |
| Example 14 | 0.9 | 0.27 |
| Example 15 | 0.0 | 0.18 |
| Example 16 | 0.0 | 0.11 |
| Comparative Example 1 | 14.9 | 1.49 |
| Comparative Example 2 | 20.0 | 3.87 |
| Comparative Example 3 | 16.6 | 1.82 |
| Comparative Example 4 | 0.0 | 0.08 |

Figure 10:
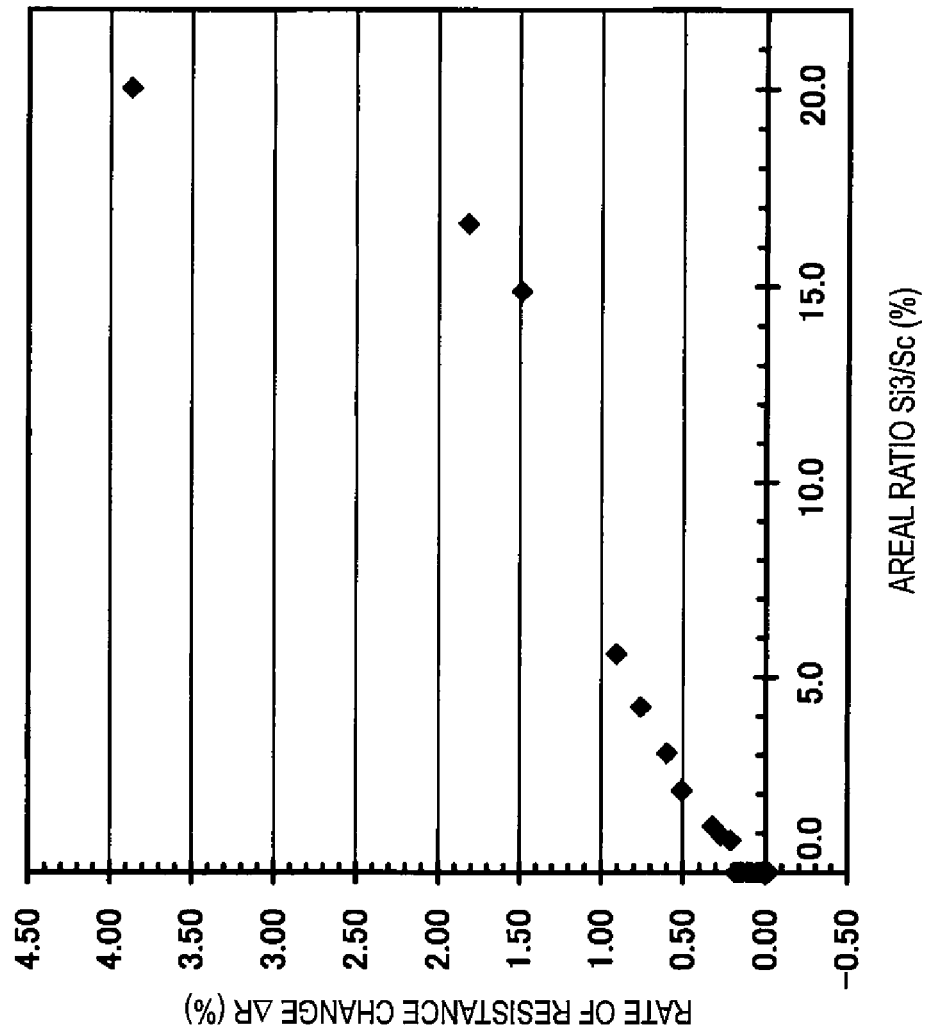
FIG. 10 is a graph showing a relationship between the areal ratio Si3/Sc and the rate of resistance change ΔR with respect to the Examples and the Comparative Examples.

It can be seen from Table 6 and the scatter diagram of FIG. 10 that the sintered oxides of the Examples and Comparative Examples each exhibit a tendency that the larger the areal ratio Si3/Sc, the higher the rate of resistance change ΔR. Specifically, it can be seen that the areal ratio Si3/Sc should be Si3/Sc≤6.0(%) in order that the rate of resistance change ΔR might be 1.0% or less (ΔR≤1.0). It can also be seen that the areal ratio Si3/Sc should be Si3/Sc≤2.0(%) in order that ΔR≤0.50(%).

Moreover, the element group M in the conductive crystal phase of each sintered oxide satisfies the following. When the conductive crystal phase is expressed by $(RE_{1-c}Sr_c)(Al_xMn_yCr_z)O_3$, then the coefficients x, y and z respectively for Al, Mn and Cr are within the following ranges. Incidentally, x+y+z=d as stated above.

$$0.40 \leq x \leq 0.87$$

$$0.05 \leq y \leq 0.52$$

$$0 < z \leq 0.05$$

It can be seen that each of the thermistor elements 2 employing the conductive sintered oxides 1 having the compositions of Examples 1 to 16 has a constant B (B(−40 to 600)) of 2,000K or less (specifically, B(−40 to 600)=1,584 to 1,942K), which is a relatively small value as compared with conventional values. These thermistor elements 2 employing the conductive sintered oxides 1 of Examples 1 to 16, which have such a value of constant B, have a suitable value of resistance over a wide range from a low temperature of −40° C. to +600° C. and make suitable temperature measurements possible.

In addition, these thermistor elements 2 have a rate of resistance change ΔR reduced to a small value within the range of ±1.0%. Even when these thermistor elements 2 are allowed to stand at a high temperature (+600° C.) over a long period of time, the resistance R(600) thereof changes little. It can hence be seen that even when the thermistor elements 2 are exposed to a high temperature, a resistance value corresponding to the temperature can be stably obtained.

On the other hand, each of Comparative Examples 1 to 3 had a constant B (B(−40 to 600)) of 1,641 to 1,707K, which is equal to or smaller than the values obtained in the Examples. However, when these thermistor elements of Comparative Examples 1 to 3 were allowed to stand at a high temperature, the resistance R(600) thereof gradually changed (increased), resulting in a rate of resistance change ΔR as high as 1.49-3.87%. Namely, the resistance R(600) thereof is not stable over a long period of time, and these thermistor elements are not desirable in this respect.

This is because in each of the sintered oxides used in Comparative Examples 1 to 3, the coefficient d is d>0.93. The larger the coefficient d, the more the Al is apt to be removed from the B sites of the conductive crystal phase and transferred to the third insulating crystal phase. It is hence presumed that the conductive crystal phase is apt to fluctuate in composition, and as a result the resistance characteristics of the conductive sintered oxide are apt to fluctuate as well.

In addition, in each of the sintered oxides used in the thermistor elements of Comparative Examples 1 to 3, the third insulating crystal phase was generated in a relatively large amount, and the ratio Si3/Sc of the areal proportion Si3 of the third insulating crystal phase to the areal proportion Sc of the conductive crystal phase reached 14.9-20.0%. It is thought that since the third insulating crystal phase, which is apt to deprive the conductive crystal phase of Al, was generated in a large amount within the sintered oxide, the conductive crystal phase was deprived of a large amount of Al, resulting in an increased rate of resistance change ΔR.

On the other hand, in Comparative Example 4, the constant B (B(−40 to 600)) considerably exceeded 2,000K. This is thought to be because the coefficient c, which indicates a ratio between the amounts of the element group RE and Sr in the A sites of the conductive crystal phase of the sintered oxide according to Comparative Example 4, was small (c≤0.18; specifically c=0.15) and, hence, the conductive crystal phase had a large value of constant B.

It can be seen from the results given above that the thermistor elements in which the coefficient c for the conductive crystal phase satisfies the range shown above (0.18<c<0.50) have a value of constant B (B(−40 to 600)) as small as 2,000K or below.

Furthermore, an investigation on the relationship between the constant B and the lower limit of the coefficient c for the conductive crystal phase in the thermistor elements of Examples 1 to 16 revealed that preferably c≥0.20. This is because in this case, the constant B (−40 to 600° C.) can be further reduced to 1,900K or below.

The lower limit of the coefficient c for the conductive crystal phase more preferably is c≥0.21. This is because in this case, the constant B (−40 to 600° C.) can be further reduced to 1,800K or below.

Moreover, the thermistor elements in which the coefficient d satisfies 0.67≤d≤0.93 can have a rate of resistance change ΔR of ΔR≤1.0(%) even when allowed to stand for 400 hours in an environment of +600° C.

Furthermore, the areal proportion Si3 of the third insulating crystal phase (the areal proportion corresponds to content, and may be 0) is smaller than the areal proportion Si1 (corresponding to content) of the first insulating crystal phase and is smaller than the areal proportion Si2 (corresponding to content) of the second insulating crystal phase. In these thermistor elements, the rate of resistance change ΔR can be regulated to ΔR≤1.0(%).

Incidentally, the first insulating crystal phase ($RE_2O_3$) and the second insulating crystal phase ($SrAl_2O_4$) are present not only in the Examples but also in each of Comparative Examples 1 to 4. It can hence be seen that the presence of these crystal phases is not especially peculiar to the sintered oxides according to the Examples.

Figure 12:
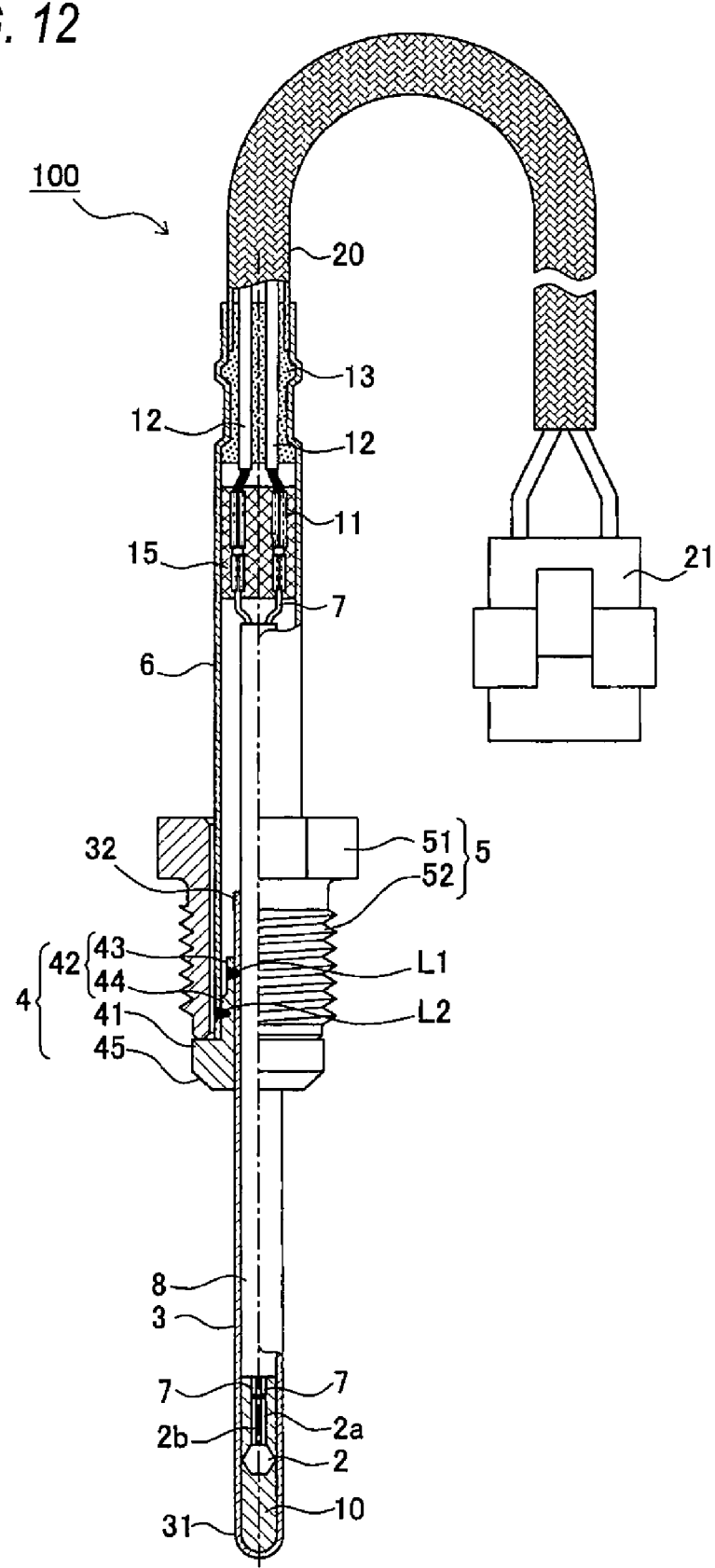
FIG. 12 is a partial sectional view illustrating the structure of a temperature sensor employing the thermistor element of FIG. 11.

The configuration of a temperature sensor 100 employing a thermistor element 2 according to the Examples is explained below by reference to FIG. 12. This temperature sensor 100 employs the thermistor element 2 as a thermosensitive element. This temperature sensor 100 is attached to the mounting part of the exhaust pipe of a motor vehicle so that the thermistor element 2 is disposed within the exhaust pipe through which the exhaust gas flows. The temperature sensor 100 is thus used for measuring the temperature of the exhaust gas.

The temperature sensor 100 includes a metallic tube 3 which extends in the direction of the axis thereof (hereinafter referred to as axial direction). The metallic tube 3 has the shape of a bottomed cylinder which is closed at the front end part 31 (lower end in FIG. 12). The thermistor element 2 of the Examples is disposed in the front end part 31. The metallic tube 3 undergoes a heat treatment beforehand, and the outer and inner side surfaces thereof are oxidized and coated with an oxide coating film. The space which surrounds the thermistor element 2 in the metallic tube 3 is filled with a cement 10 to fix the thermistor element 2. The rear end 32 of the metallic tube 3 is open, and this rear end 32 has been forced and inserted into a flange member 4.

The flange member 4 includes a cylindrical sheath part 42 extending in the axial direction and a flange part 41 which is located on the front end side of the sheath part 42 (lower part in FIG. 12), has a larger outer diameter than the sheath part 42, and projects outward in the radial direction. The front end of the flange part 41 constitutes a tapered bearing surface 45 for sealing on the mounting part of an exhaust pipe. The sheath part 42 has a two-stage shape composed of a front-side sheath part 44, which is located on the front side, and a rear-side sheath part 43, which has a smaller diameter than the front-side sheath part 44.

The outer peripheral surface of the metallic tube 3 forced into the flange member 4 is laser-welded at the part L1 to the rear-side sheath part 43 throughout the whole periphery, and the metallic tube 3 is thereby fixed tenaciously to the flange member 4. A metallic cover member 6 of a substantially cylindrical shape is placed on the front-side sheath part 44 of the flange member 4 and gas-tightly laser-welded at the part L2 to the front-side sheath part 44 throughout the entire periphery thereof.

A mounting member 5 having a hexagon nut part 51 and a screw part 52 is rotatably fitted on the periphery of the flange member 4 and metallic cover member 6. The temperature sensor 100 of the Examples is fixed to an exhaust pipe (not shown) by bringing the bearing surface 45 of the flange part 41 of the flange member 4 into contact with the mounting part of the exhaust pipe and screwing the nut 5 into the mounting part.

A sheath member 8 having a pair of core wires 7 therein is disposed within the metallic tube 3, flange member 4, and metallic cover member 6. This sheath member 8 is configured of a metallic outer casing, the pair of conductive core wires 7, and an insulating powder which fills the space inside the outer casing and holds the core wires 7 while insulating the outer casing from the core wires 7. An oxide coating film is formed beforehand by a heat treatment also on the outer casing of the sheath member 8. The electrode wires 2a and 2b of the thermistor element 2 are connected by laser welding to the core wires 7 which project (downward in the figure) from the front end of the outer casing of the sheath member 8 in the metallic tube 3.

On the other hand, the core wires 7 projecting from the rear end of the sheath member 8 are connected to a pair of lead wires 12 by means of crimping terminals 11. The core wires 7 are insulated from each other and the crimping terminals 11 are insulated from each other by means of insulating tubes 15.

The pair of lead wires 12 is led out from inside the metallic cover member 6 through lead wire insertion holes of an elastic sealing member 13 inserted into a rear end part of the metallic cover member 6, and is connected to the terminal members of a connector 21 for connection to an external circuit (not shown; for example, an ECU). Thus, the output from the thermistor element 2 is taken out of the core wires 7 of the sheath member 8 and sent to an external circuit, which is not shown, through the lead wires 12 and the connector 21. The temperature of the exhaust gas is thereby measured. The lead wires 12 are covered with a glass-braided tube 20 for protection against external force such as flying stones. A front end part of this glass-braided tube 20 is fixed by crimping to the metallic cover member 6 together with the elastic sealing member 13.

Since the temperature sensor 100, which has the structure described above, employs the thermistor element 2 including the conductive sintered oxide 1 described above, the temperature of the exhaust gas of an automobile engine can be suitably measured over a wide range from a low temperature of $-40°$ C. to a high temperature of $+600°$ C. In addition, even when exposed to a high temperature over a prolonged period, the thermistor element changes little in resistance with the lapse of time and exhibits a stable resistance. This temperature sensor hence has stable properties.

Furthermore, by selecting a suitable pull-up resistance for use in a detection circuit, the temperature sensor 100 can be configured so that when, for example, a voltage of 5 V is applied to the temperature sensor 100, the output therefrom can be obtained as a voltage which varies in the range of 4.8-0.2 V in the temperature range of $-40°$ C. to $+600°$ C. Consequently, even when the output is inputted to a circuit having a maximum input voltage of 5 V, the temperature can be suitably measured. In addition, even when the temperature sensor 100 (thermistor element 2) has a low temperature ($-40°$ C.), the output therefrom is about 4.8 V and does not reach 5.0 V. A difference between this state and wire breakage can hence be recognized, and wire breakage can be easily and precisely detected. Likewise, even when the temperature sensor 100 (thermistor element 2) has a high temperature ($+600°$ C.), the output therefrom is about 0.2 V and does not fall to 0 V. A difference between this state and short-circuiting can hence be recognized, and short-circuiting can be easily and precisely detected.

The invention has been described above by reference to the above Examples. However, the invention should not be construed as being limited thereto. It should further be apparent to those skilled in the art that various changes in form and detail of the invention as shown and described above may be made. It is intended that such changes be included within the spirit and scope of the claims appended hereto.

For example, for producing the conductive sintered oxide (thermistor element), powders of the compounds containing the elements which were shown in the Examples can be used as starting-material powders. Also usable besides these are compounds such as oxides, carbonates, hydroxides and nitrates. The use of oxides or carbonates is especially preferred.

As the element group M consisting of Al and at least one element selected from Groups IVA, VA, VIA, VIIA and VIII (Groups 4-10 new IUPAC numbering), both Mn and Cr or Mn were used besides Al in the Examples. However, one or more other elements selected from the Groups IVA, VA, VIA, VIIA and VIII (Groups 4-10 new IUPAC numbering) can be used optionally together with Mn or Cr.

Furthermore, the conductive sintered oxide may contain other components such as, for example, Na, K, Ga, Si, C, Cl and S so long as the incorporation of such components does not impair sinterability for producing the conductive sintered oxide or the properties required of the conductive sintered oxide, thermistor element, or temperature sensor, such as constant B and high-temperature durability of temperature characteristics.

This application claims priority from Japanese Patent Application No. 2010-182635 filed on Aug. 17, 2010, the disclosure of which is incorporated herein by reference in its entirety.

What is claimed is:

1. A conductive sintered oxide which comprises:
a conductive crystal phase having a perovskite structure represented by $(RE_{1-c}Sr_c)M_dO_3$, in which
RE is a group of elements consisting of Yb and/or Lu and at least one element selected from Group IIIA excluding Yb, Lu and La and
M is a group of elements consisting of Al and at least one element Selected from Groups IVA, VA, VIA, VITA and VIII,
a first insulating crystal phase represented by $RE_2O_3$, in which RE is as defined above, and
a second insulating crystal phase represented by $SrAl_2O_4$, wherein
the conductive crystal phase has a coefficient c which satisfies $0.18<c<0.50$,
the conductive crystal phase has a coefficient d satisfying $0.67 \leq d \leq 0.93$, the coefficient d indicating a ratio between an amount of the element group (RE1-cSrc) constituting A sites and the amount of the element group M constituting B sites of the conductive crystal phase, and
a content of a third insulating crystal phase represented by $RE_4Al_2O_9$, the content of the third insulating crystal phase represented by $RE_4Al_2O_9$ not including zero, is smaller than the content of the first insulating crystal phase and is smaller than the content of the second insulating crystal phase.

2. The conductive sintered oxide as claimed in claim 1, wherein in a cross-section of the conductive sintered oxide, a ratio of an areal proportion of the third insulating crystal phase Si3 to an areal proportion of the conductive crystal phase Sc, Si3/Sc (%), satisfies Si3/Sc≤6.0 (%).

3. The conductive sintered oxide as claimed in claim 1, wherein the coefficient d satisfies $0.67 \leq d < 0.90$.

4. The conductive sintered oxide according to claim 1, wherein the element group M includes Al, Mn and Cr, and
the conductive crystal phase is represented by $(RE1-cSrc)(Al_xMn_yCr_z)O_3$, in which the coefficients x, y and z (x+y+z=d) satisfy the following $0.40 \leq x \leq 0.87$ $0.05 \leq y \leq 0.52$ $0 < z \leq 0.05$.

5. A thermistor element which comprises the conductive sintered oxide as claimed in claim 1.

6. A temperature sensor which comprises the thermistor element as claimed in claim 5.

* * * * *